Dec. 4, 1951 M. BAINBRIDGE ET AL 2,576,991
APPARATUS FOR HARVESTING PINEAPPLES
Filed March 22, 1946 8 Sheets-Sheet 1

INVENTOR.
Marvin Bainbridge, William P. Tuttle,
Henry J. Baldwin and Eugene S. Sheffield, Jr.
BY
Ritter, Mechlin & Muir
Their Attorneys Dec. 4, 1951  M. BAINBRIDGE ET AL  2,576,991
APPARATUS FOR HARVESTING PINEAPPLES
Filed March 22, 1946  8 Sheets-Sheet 2

Fig. 2

INVENTOR.
Marvin Bainbridge, William P. Tuttle,
Henry J. Baldwin and Eugene S. Sheffield, Jr.,
BY
Ritter, Mechler & Meier
their Attorneys Dec. 4, 1951 M. BAINBRIDGE ET AL 2,576,991
APPARATUS FOR HARVESTING PINEAPPLES
Filed March 22, 1946 8 Sheets-Sheet 5

INVENTORS
Marvin Bainbridge, William P. Tuttle,
Henry J. Baldwin and Eugene S. Sheffield, Jr.,
BY Their Attorneys Dec. 4, 1951  M. BAINBRIDGE ET AL  2,576,991
APPARATUS FOR HARVESTING PINEAPPLES
Filed March 22, 1946  8 Sheets-Sheet 6

INVENTORS
Marvin Bainbridge, William P. Tuttle,
Henry J. Baldwin and Eugene S. Sheffield, Jr.,
BY Retter, Mechlen & Muir
Their Attorneys Dec. 4, 1951 M. BAINBRIDGE ET AL 2,576,991
APPARATUS FOR HARVESTING PINEAPPLES
Filed March 22, 1946 8 Sheets-Sheet 7

INVENTORS
Marvin Bainbridge, William
P. Tuttle, Henry J. Baldwin and
BY Eugene S. Sheffield, Jr., their Attorneys Patented Dec. 4, 1951

2,576,991

UNITED STATES PATENT OFFICE 2,576,991

APPARATUS FOR HARVESTING PINEAPPLES

Marvin Bainbridge, Kahului, and William P. Tuttle and Henry J. Baldwin, Paia, and Eugene S. Sheffield, Jr., Kahului, Territory of Hawaii, assignors to Maui Pineapple Company, Limited, Paia, Territory of Hawaii, a corporation of the Territory of Hawaii Application March 22, 1946, Serial No. 656,192

19 Claims. (Cl. 214—83.1)

Our invention relates to a method and apparatus for harvesting pineapples and other crops of easily bruisable fruit and its principal object is to provide a simple method and apparatus for conveying pineapples from the field being harvested and loading them in bulk into the lading receiving space of a vehicle.

Another object of the invention is to provide a mobile machine for harvesting pineapples and loading them into the lading receiving space of a vehicle occupying the same road as the mobile machine bordering the field being harvested.

As pointed out in our copending application Serial No. 690,170, filed August 13, 1946, it is necessary that pineapples ripen on their plants and, when picked in this condition, they are easily bruisable and consequently require careful handling. The machine of the present invention is adapted to mechanically transport the fruit which is placed thereon by pickers in the field, raise the fruit to an elevation above the body of the vehicle into which the pineapples are to be loaded and to conduct the elevated pineapples to a position over the floor of the body of the vehicle, the discharge end of the distributing conveyer being disposed at a minimum height above the top of the body so that the fruit may be deposited in the body without being bruised.

A primary feature of the invention consists in providing a harvesting machine with a conveyer which is adapted to extend over the field being harvested and is pivotally mounted so that it may extend in the desired direction above the field.

Another feature of the invention consists in providing the harvesting machine with a distributing conveyer for delivering pineapples to the body of a vehicle to be loaded, the distributing conveyer being mounted on a substantially vertical axis to swing into a position from which the pineapples may fall from the discharge end thereof into the body of the vehicle.

Another feature of the invention consists in providing a mobile harvesting machine with conveying apparatus for conveying picked pineapples from the field and raising them to an elevation above the cab of the truck into which the pineapples are to be loaded and in further providing the harvester with a distributing conveyer for receiving the elevated pineapples and conducting them downwardly to a point immediately over the body of the vehicle where they may descend a minimum distance into the body to avoid danger of bruising the fruit.

A further feature of the invention consists in supporting the main conveyer of the machine which is adapted to extend above the field being harvested and the distributing conveyer of the machine so that they may swing independently on substantially vertical axes.

A still further feature of the invention consists in providing the harvesting machine with upper and lower turntables on which the inner ends of the main conveyer and the distributing conveyer are respectively mounted.

A still further feature of the invention consists in pivotally connecting the main and distributing conveyers to the upper and lower turntables respectively on substantially horizontal axes whereby they may be vertically adjusted.

A still further feature of the invention consists in providing a mobile machine for harvesting pineapples and for loading them into the lading receiving space of a vehicle occuying the same road as the harvester bordering the field being harvested, coupling means being provided to connect the mobile machine and the vehicle to maintain a fixed distance between them during the loading operation.

Still another feature of the invention consists in harvesting pineapples with a mobile harvesting unit having a conveyer extending across the rows of the field being harvested, and raising the pineapples to an elevation above the level of the body of the truck to be loaded and thereafter conducting the elevated pineapples to a point of discharge over said body whereby they may be deposited in the body of a truck occupying the same road as the harvesting unit.

Other and more specific features of the invention, residing in advantageous forms, combinations and relations of parts, will hereinafter appear and be pointed out in the claims.

In the drawings,

Figure 3 is an enlarged fragmentary view of the main body portion of the machine looking in the same direction in which Figure 2 is taken.

Referring more particularly to the drawings, I indicates a mobile truck which carries a main or collecting conveyer 2, flight and elevating conveyers 3 and a distributing conveyer 4. The main conveyer and the flight and elevating conveyers are mounted to rotate about a substantially vertical axis on a turntable 5 in a platform base 6 of the truck, while the distributing conveyer is mounted on an auxiliary or upper turntable 7 spaced above the turntable 5 so that it may rotate about a vertical axis independently of the other conveyers. This enables the distributing conveyer to be placed in any position desired with respect to the other conveyers, irrespective of their positions and the position of the mobile truck itself, so that its discharge end may be placed over the truck into which the pineapples are to be loaded to permit the pineapples to drop from the conveyer into the truck.

The main or collecting conveyer 2, being supported at one end constitutes a boom, and it is preferably of truss form and rigid throughout its entire length. For this purpose, the conveyer may be rigidly formed of upper and lower pipes or rods 8 extending longitudinally thereof, and the rods on each side of the conveyer are preferably connected to each other by a plurality of vertical rods 9 and inclined rods 10, the rods 10 respectively extending from the top of one vertical rod 9 to the bottom of the next adjacent one. The two side frames thus formed of the conveyer may be conveniently connected by a plurality of pairs of diagonally extending rods 11 preferably secured to the vertical rods 9.

Figure 15:
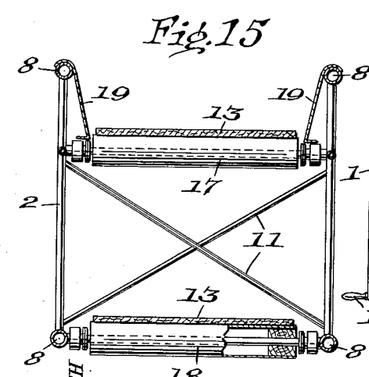
Figure 15 is an enlarged sectional view taken on line 15—15 of Figure 13.

At the outer end of the conveyer is an adjustable roller or pulley 12 around which passes an endless belt 13. The adjustment of the pulley may be effected as shown in our copending application Serial No. 690,170, filed August 13, 1946, by means of cranks 14. At the inner end of the main conveyer structure is a pair of vertically spaced rollers or pulleys 15 around which the endless belt also passes which are supported in suitable bearings carried by a supporting bracket 16 secured to the inner end of the boom conveyer. Intermediate the rollers at the two ends of the conveyer, the upper and lower reaches of the endless belt 13 may be supported by a plurality of suitably spaced rollers 17 and 18, respectively, as shown in Figure 15. Moreover, since the upper reach is below the upper rods of the conveyer structure, the spaces are preferably closed at each side of the conveyer by side walls 19.

Extending rearwardly from the inner end of the conveyer boom at each side thereof are a pair of converging members 20 which are connected at their inner ends by U-shaped brackets 21 which afford bearings for a shaft 22. These brackets may be closed by any suitable means, such as cotter pins 23, to firmly hold the shaft therein.

Figure 10:
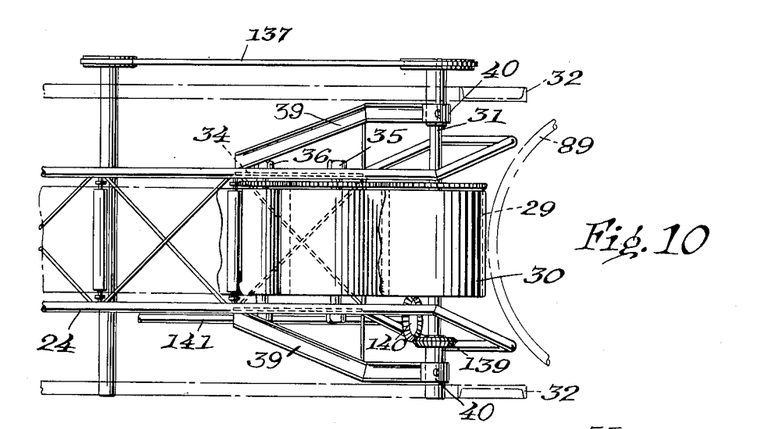
Figure 10 is a plan view of the elevating conveyer taken at right angles to the direction of movement thereof.
Figure 11:
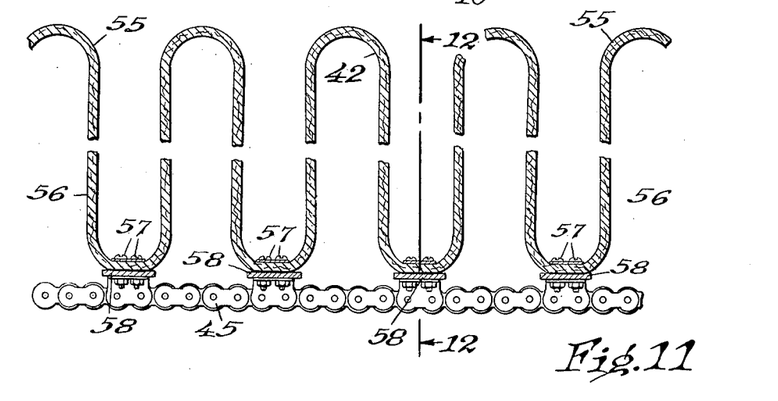
Figure 11 is an enlarged fragmentary side elevational view of the belt of the flight conveyer which forms part of the elevating conveying means.

Positioned at the discharge end of the conveyer 2 for receiving pineapples therefrom are the flight and elevating conveyers 3 for raising the pineapples to a level above the lading receiving space of a vehicle or other receptacle into which they are to be loaded. The elevating conveyer, designated 24, is formed similarly to the main conveyer 2 in that it also is of truss form, having upper and lower rods or pipes 25 connected by rods 26 substantially perpendicular thereto and by relatively inclined rods 27. At the upper end of the conveyer, the rods 25 are preferably connected together by substantially semi-circular portions 28 which diverge laterally from the sides of the conveyer, as seen in Figure 10 particularly. A roller or pulley 29 extends transversely of the conveyer at its upper end around which passes an endless belt 30. The roller is mounted on a shaft 31 supported in bearings carried by a pair of upstanding members 32 which may be conveniently of channel shape. At the lower end of the elevating conveyer, the endless belt passes around a pulley or roller 33 which is mounted on a shaft 22 heretofore mentioned.

Adjacent the upper roller 29, the upper and lower rods 25 of the elevating conveyer may advantageously be connected by plates 34 at each side of the conveyer, which serve as suitable supports for transversely extending shafts 35 and 36, respectively. On shaft 35 is a large idler roller 37 and on shaft 36 is a smaller idler roller 38 around both of which the endless belt passes. Angle shaped arms 39 may, if desired, be secured to the plates and extend upwardly therefrom to receive members 40 to encircle shaft 31, and it will be observed that, except for additional means to be hereinafter pointed out, the elevating conveyer is supported by the shaft and that it is pivotally movable about it as a center. Like the endless belt of the main conveyer 2, the upper and lower reaches of the elevating conveyer are supported intermediate the rollers 29 and 33 by a plurality of rollers 41.

Lapping the elevating conveyer and extending upwardly substantially parallel therewith from the discharge end of the main conveyer is a flight conveyer 42 which may conveniently consist of upper and lower sprocket wheels 43 and 44, respectively connected by sprocket chains 45. The lower sprocket wheels 44 are mounted on a shaft 46 supported in bearings 47 rigid with the upper portion of the bracket 16. Encircling the shaft 46 is a sleeve 48 to which the lower end of rods 49 are rigidly connected, the upper end of the rods being provided with a sleeve 50 which encircles the shaft 51 on which the upper sprocket wheels 43 are mounted. The rods 49 may be conveniently made in sections and connected by turnbuckles 52 whereby the sprocket wheels may be adjustably held at the desired distance apart.

The upper end of the flight conveyer is supported in suitably spaced relation to the elevating conveyer by a pair of plates 53 which are rigidly secured to the rods 25 thereof. These plates may be conveniently connected by a transversely extending bar 54 which carry sleeves encircling the rods 49 for slidably supporting them.

Secured to the sprocket chains 45 is an endless belt 55 for cooperating with the pineapples delivered from the main conveyer to the endless belt 30 of the elevating conveyer to raise them without bruising, the pineapples thus being prevented from rolling or moving downwardly along the upper reach of the endless belt 30. The belt 55 is attached to the sprocket chains 45 at a plurality of spaced points so that it will project laterally therefrom intermediate its points of attachment to thereby provide a plurality of flexible portions or folds 56. While some of the pineapples may occupy the pockets or spaces between the projecting portions 56 of the belt, most of them will be engaged by the folds themselves. The folds will, therefore, be distorted but they will exert sufficient pressure on the pineapples to hold them, without rolling, against the belt 30 of the elevating conveyer and thus cause them to move therewith. Thus the folds 56 of the belt 55 primarily serve to provide flexible means for pressing the pineapples against the belt of the elevating conveyer to insure their movement therewith.

Figure 12:
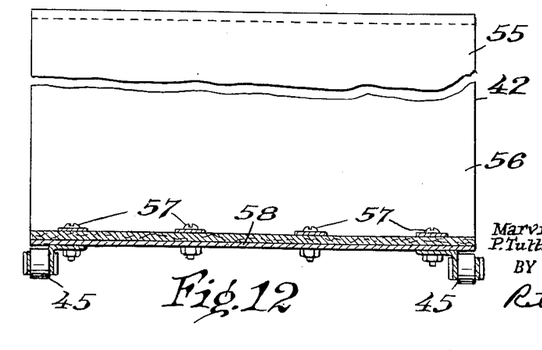
Figure 12 is a sectional view taken on line 12—12 of Figure 11.
Figure 13:
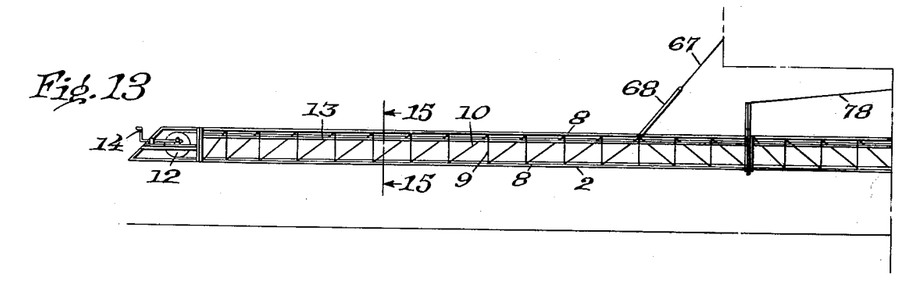
Figure 13 is a side elevational view of the outer end of the main conveyer and is an extension of that portion of the main conveyer shown in Figure 2.
Figure 14:
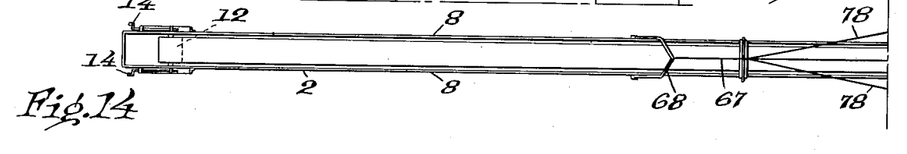
Figure 14 is a plan view of the construction shown in Figure 13.

Instead of directly connecting the belt 55 to the sprocket chains, it is preferred to connect them by bolts or the like 57 to transverse bars 58 which are connected at their opposite ends to the chains and consequently move therewith. The belt employed may be conveniently of greater width than the bars 58 so that the side edges thereof will engage the sprocket chains and deflect them upwardly, as shown in Figure 12.

The conveying apparatus thus far described is supported from an adjustable boom 59 which is bifurcated at its inner end, as indicated at 60, to straddle the flight and elevating conveyers. The inner ends of the bifurcations 60 are pivotally connected about substantially horizontal axes to structural members 61 secured to and movable with the lower turntable 5. The angularity of the boom with respect to the ground may be varied by suitable operation of a cable 62 which is movably connected to the outer end of the boom. The cable 62, which is preferably anchored at one end to the upwardly extending members 32, passes around a sheave 63 flexibly connected to the outer end of the boom by a cable or chain 64 and then under a sheave 65 mounted on a shaft carried by the upwardly extending members 32 to a winch 66 mounted adjacent the upper ends thereof whereby, upon suitable rotation of the winch, the effective length of the cable 62 may be increased or decreased and the angularity of the boom thereby varied.

The outer end of the conveyer boom 2 is preferably supported by a cable 67 which is connected to a yoke 68 pivotally secured to the conveyer structure. From its outer end, the cable passes over a sheave 69 carried on the free end of the boom 59 and from there it is lead over a second sheave 70 mounted on a shaft 71 on the uprights 32 to a power operated winch 72 on the floor of the turntable 5. Thus by suitable operation of the winch the outer end of the main conveyer 2 may be raised or lowered in conformity with the topography of the land while the mobile machine is traveling so as to maintain the conveyer near the tops of the pineapple plants and thereby facilitate placing the picked fruit thereon.

The inner end of the main conveyer and the adjacent ends of the elevating and flight conveyers are supported by a pair of cables 73 which are disposed at opposite sides of the conveyer and are adapted to be respectively wound on a pair of winches 74 which may be conveniently mounted at the upper ends of the members 32 and which can be simultaneously operated by a single crank 75. From the winches 74, the cables 73 pass around sheaves 76 respectively mounted on opposite sides of the boom 59 and then around pulleys 77 which may be conveniently movably connected to shaft 22 and finally back to adjacent the sheaves 76 where they are anchored. As cables 73 support the weight of the inner end of the conveyer and serve to maintain the flight and elevating conveyers at the desired inclination, the angle of the main conveyer with respect to the ground may be varied by operation of the cables 73 alone. Since the elevating conveyer is pivotally connected at its upper end to the machine, operation of the cable 73 to raise the adjacent ends of the main and elevating conveyers results in swinging the elevating conveyer outwardly and this in turn causes the main conveyer to extend varying distances from the harvesting machine. Thus the main conveyer may be shifted longitudinally so as to compensate for variations in the distance of the road from the edge of the field. Operation of cable 67, either with or without operation of cables 73, or of cable 62 which supports the boom itself, will enable the outer end of the main conveyer to be raised high enough to clear all usual obstacles.

Figures 1, 17, 18:
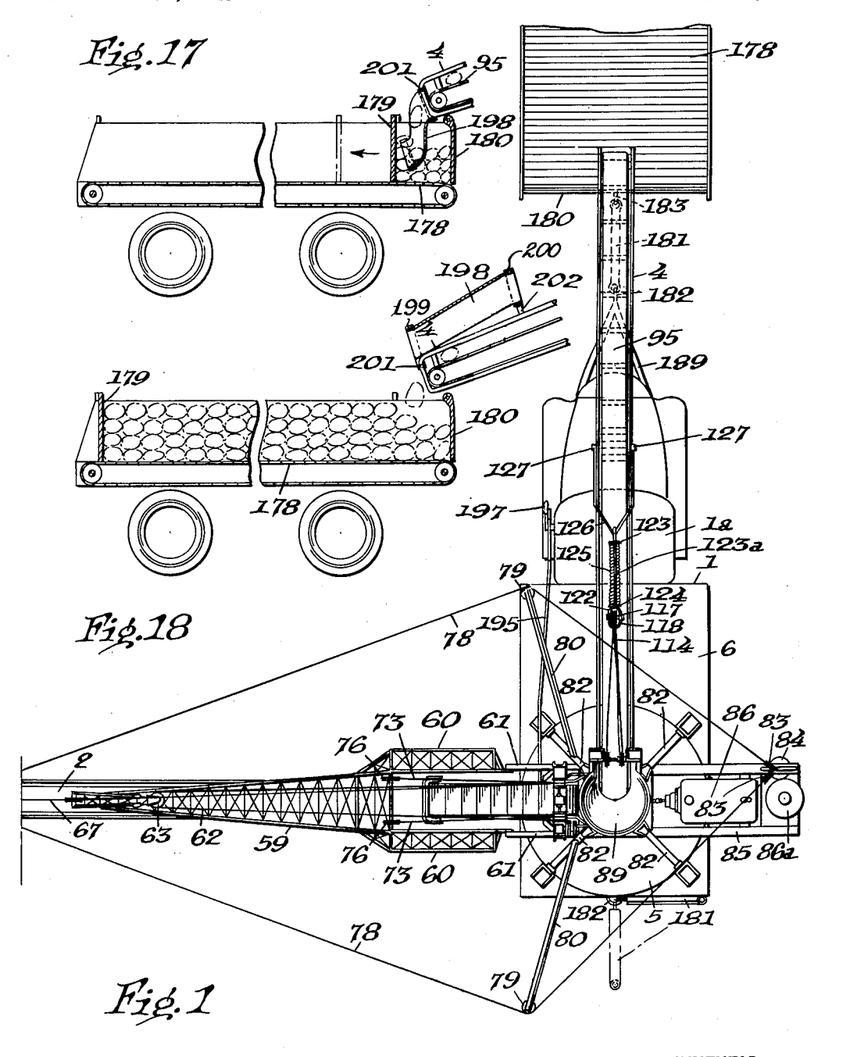
Figure 1 is a plan view of the harvesting machine and the rear end of the body of the vehicle into which the pineapples are loaded.
Figure 17 is a diagrammatical view of the body of the vehicle into which the pineapples are loaded, the forward wall of the lading receiving space of the body being shown as having been moved to a position closely adjacent the tail gate, and the discharge end of the distributing conveyer being shown immediately above the body.
Figure 18 is a view similar to Figure 17 showing the body of the vehicle almost completely filled with pineapples and a portion of the discharge end of the distributing conveyer.
Figure 2:
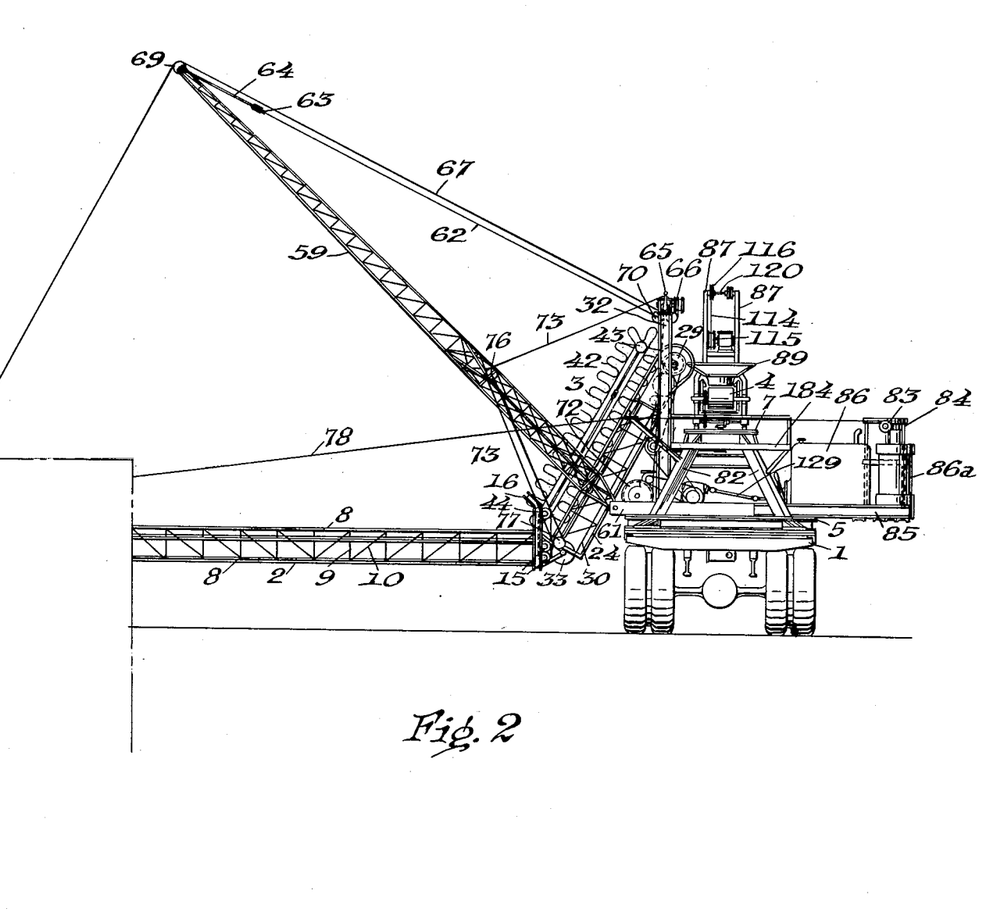
Figure 2 is an end view of the construction illustrated in Figure 1.
Figure 3:
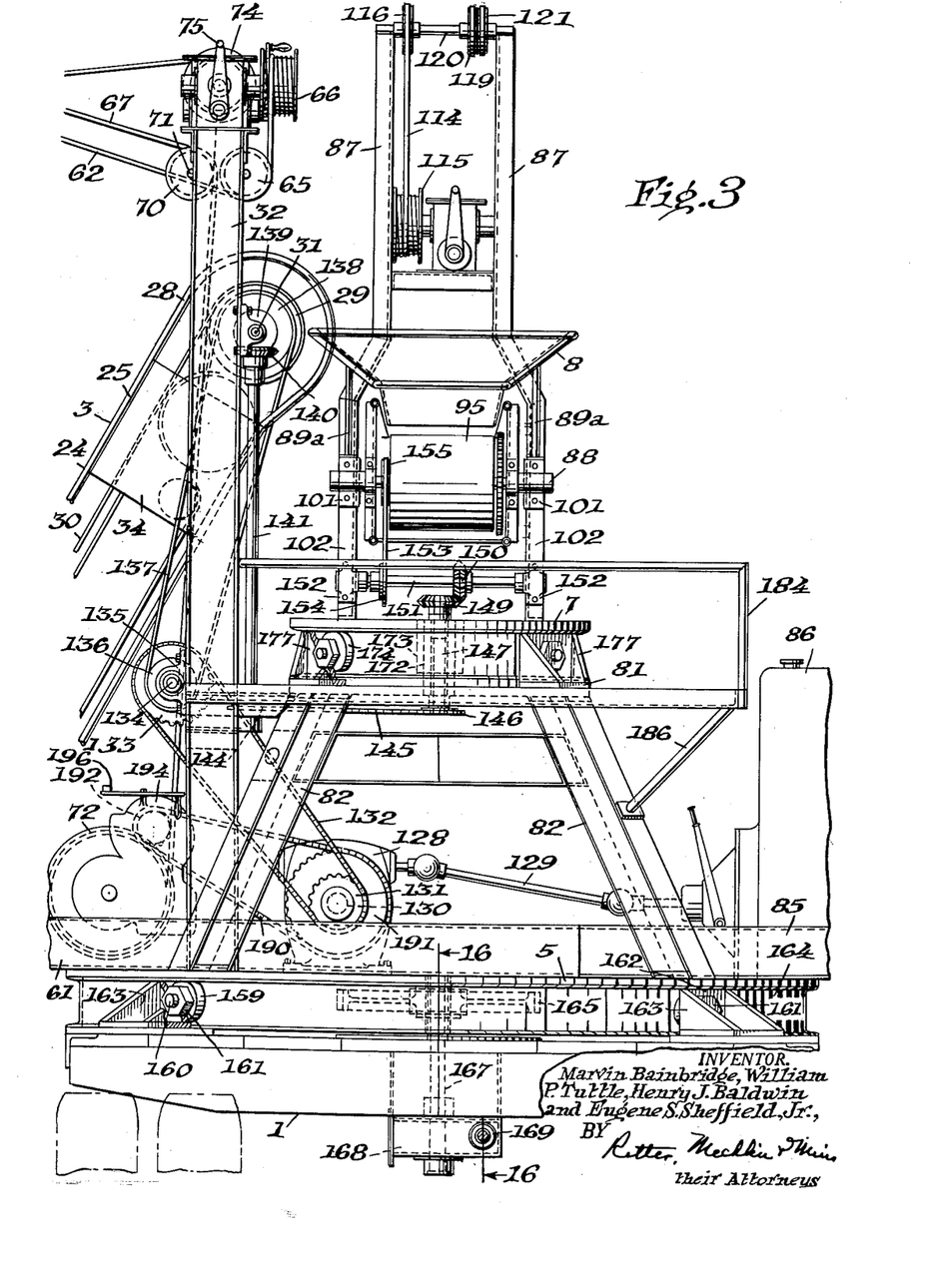
Figure 4:
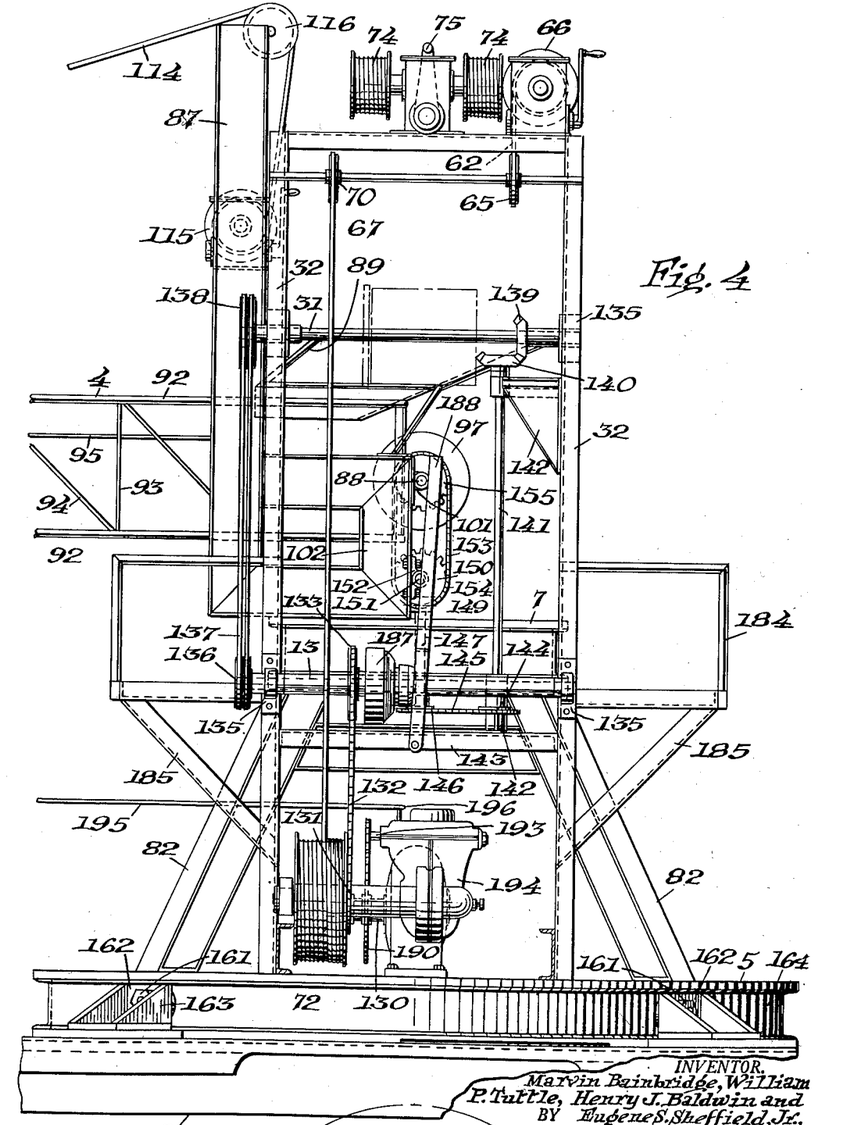
Figure 4 is an enlarged fragmentary elevational view taken at right angles to Figure 3.
Figures 5, 6:
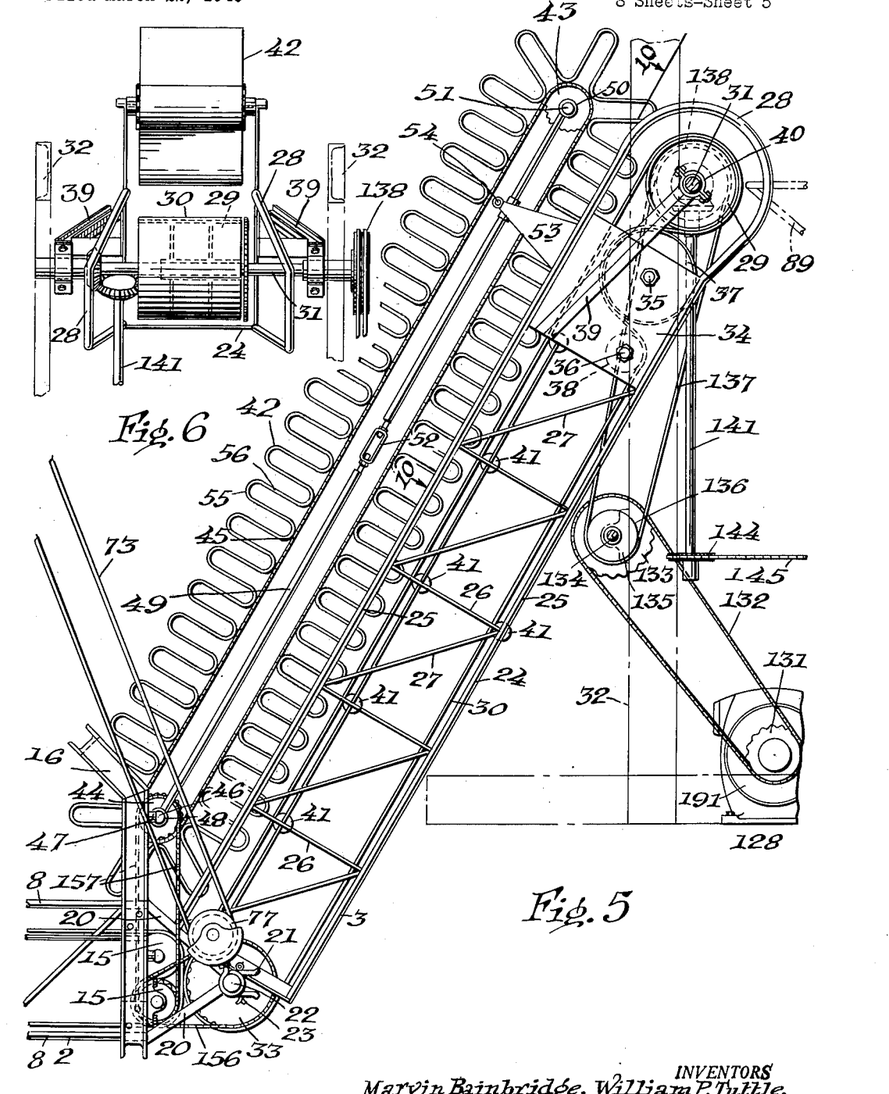
Figure 5 is an enlarged fragmentary view of the elevating conveyer and the adjacent inner end of the main conveyer.
Figure 6 is a top plan view of the elevating conveyer taken in the direction of movement thereof.
Figures 7, 9:
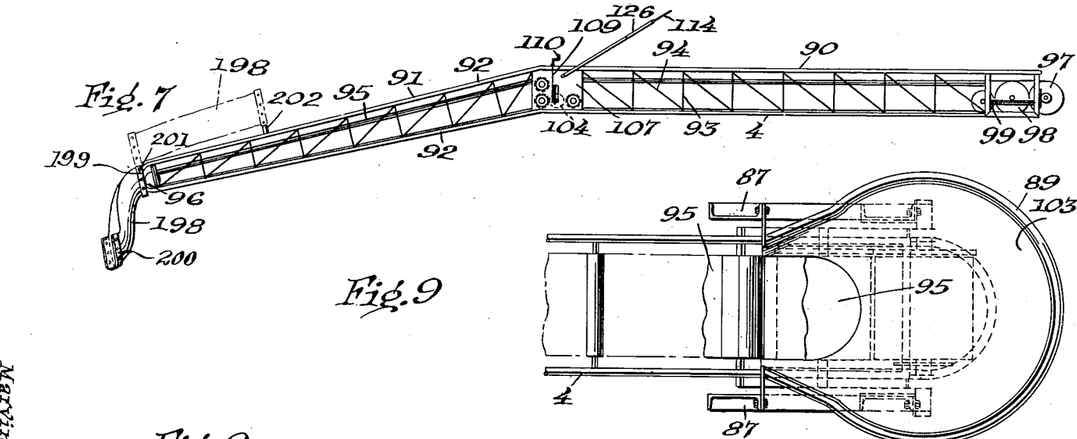
Figure 7 is a side elevational view of the distributing conveyer of the machine.
Figure 9 is a plan view of the right hand end of the construction shown in Figure 8.
Figure 8:
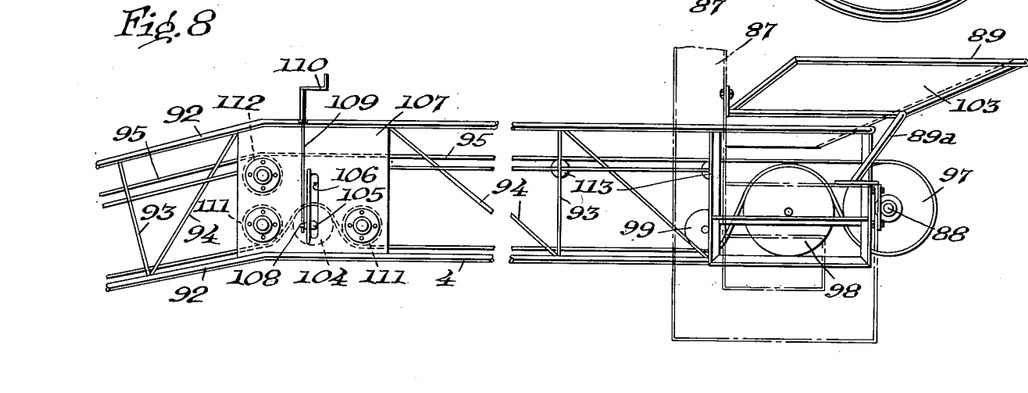
Figure 8 is an enlarged fragmentary view of the inner portion of the distributing conveyer and the hopper for guiding the pineapples thereto from the elevating conveyer.
Figure 16:
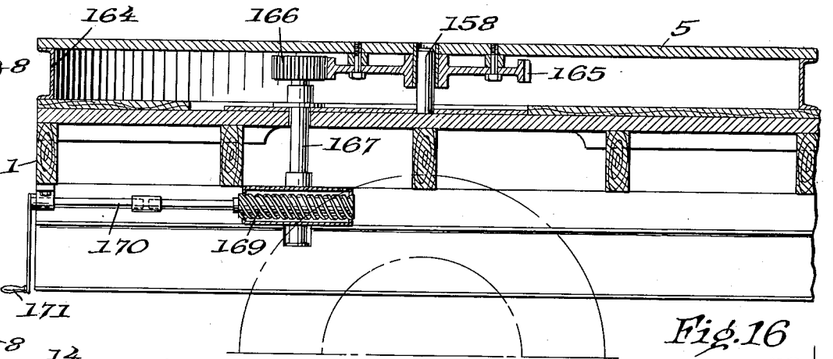
Figure 16 is a fragmentary sectional view of the base of the harvesting machine illustrating mechanism for rotating the lower turntable.

To impart lateral stability to the main conveyer 2 when the turntable 5 has been moved to a desired position, a pair of cables 78 may be connected to adjacent the outer end of the conveyer, as seen in Figures 16 and 18. Each of the cables 78 inclines outwardly from the conveyer to pass around a sheave 79 carried on the outer end of an arm 80 which projects laterally from the machine. The inner ends of arms 80 may be rigidly secured to two of the four upwardly converging legs 82 extending upwardly from the top of turntable 5 to the supporting plate 81 of the upper turntable 7. From the sheaves 79 the cables incline inwardly and pass over relatively inclined sheaves 83 for connection to a counterweight 84.

The structural members 61 to which the inner end of the boom 59 is pivotally connected constitute extensions of a frame 85 on which a power unit 86 and the counterweight 84 are carried. This frame is also secured to the turntable and consequently turns with it. The lower ends of the upstanding members 32 are also connected to the turntable 5 and, since conveyer 2, the flight and elevating conveyers 3, together with the supporting boom 59 are also connected thereto, all these parts move as a unit when the turntable is rotated. In addition to the engine, a large counterweight 86a is mounted on the frame 85 so as to balance the weight of the two conveyers and the supporting boom which extend from the opposite side of the turntable.

On the upper or auxiliary turntable 7 carried by the base plate 81 is a pair of upstanding members 87, which in this embodiment of the invention are shown as being of channel shape and which support a transversely extending shaft 88 on which the inner end of the distributing conveyer is mounted. Rigid with the upstanding members 87 above the inner end of the distributing conveyer is a hopper or the like 89 into which the pineapples from the elevating and flight conveyers discharge for transfer to the distributing conveyer, the center of the hopper being preferably concentric with the axis of rotation of the turntables 5 and 7 so that, when the distributing conveyer is swung on its vertical axis relatively to the other conveyers, it will still be in a position to receive pineapples discharged from the elevating and flight conveyers. The hopper may be conveniently supported by downwardly extending feet 89a secured to inwardly disposed portions of the upstanding members 87.

The distributing conveyer consists of a normally horizontal portion 90 and a downwardly inclined portion 91, the discharge end of which is adapted to be positioned immediately above the body of the truck into which the pineapples are to be loaded for transportation to the cannery so that the distance they drop into the truck body will be a minimum. The distributing conveyer is also of truss form having upper and lower longitudinally extending corner rods 92 which are connected by a series of rods 93 perpendicular to the rods 92 and by relatively inclined rods 94.

The distributing conveyer has an endless belt 95 which passes around rollers 96 and 97, respectively, at the outer and inner ends of the conveyer structure. In addition the belt also may pass around a relatively larger roller 98 and a relatively small guide roller 99 adjacent the inner end of the conveyer. The shaft 88 on which roller 97 is mounted extends beyond the ends of the roller and at each end is mounted in a suitable bearing 101 and thereby affords a horizontal axis on which the conveyer may be vertically adjusted with respect to the harvesting machine. In order that the hopper 89 may also be secured to the upstanding members 87 and yet be in position to deliver pineapples to the endless belt of the distributing conveyer, the shaft 88 is secured to auxiliary upstanding members 102 spaced inwardly from the main members 87. To prevent the pineapples from being bruised as they are delivered to the distributing conveyer, the hopper 89 is preferably lined with rubber belting 103.

Adjacent the point where the distributing conveyer angles downwardly, mechanism is preferably provided for adjusting the tension of the endless belt 95 of the distributing conveyer. This means may conveniently consist of a roller 104 which is rotatably mounted upon a shaft 105, the opposite ends of which project through slots 106 in side plates 107 secured to the corner rods 92 of the conveyer structure. Secured to each end of the shaft and extending at right angles thereto is a member 108 which also extends through a slotted plate welded or otherwise secured to adjacent plate 107. The outer ends of the members 108 have interiorly screw threaded sleeve portions for cooperating with externally screw threaded shafts 109 whose upper ends are provided with cranks 110 whereby the shaft 105 of the roller 104 may be raised or lowered to decrease or increase the tension in the endless belt 95 as desired. On opposite sides of the adjusting roller 104 are a pair of guide rollers 111 and another guide roller 112 is provided at the point where the distributing conveyer angles downwardly so that the upper reach of the belt 95 will angle similarly. Like the main conveyer 2 the distributing conveyer may be provided with a plurality of rollers 113 for supporting the upper and lower reaches of the endless belt intermediate the outer and inner rollers 96 and 97 respectively. The distributing conveyer is supported at the desired distance above the ground by a cable 114 which at one end is wound around a manually operable winch 115. From the winch, the cable passes upwardly over a sheave 116 and thence downwardly to a sheave 117 carried in a bracket 118 connected to the outer end of the conveyer. So as to obtain a mechanical advantage in a well known way, the sheave 117 is provided with two grooves so that the cable will first pass around the sheave in one of the grooves and then back to a sheave 119 mounted on the same shaft 120 which carries sheave 116. The cable may then be lead around the second groove in the sheave 117, thence back to a third sheave 121 on shaft 120 and then back to the bracket 118 to which it is preferably anchored.

The bracket 118 has screw threaded connection with a coil spring holder 122 provided with a base plate 123 on which a compression spring 123a is seated. Cooperating with the other end of the spring is the plate 124 of a yoke 125 by which the spring assembly is connected to a bifurcated member 126 pivotally connected, as indicated at 127, to the distributing conveyer. Thus it is to be seen that, in addition to the mechanical advantage which is obtained in operating the supporting cable 114, the distributing conveyer is flexibly or resiliently supported through the intermediacy of the coil spring 123a.

Motive power is imparted to the conveyers from the engine or motor 86 through a speed reducing unit 128 by means of a shaft 129 which is universally connected to both the engine and the speed reducing unit. The output shaft 130 of the speed reducing unit is preferably provided with a sprocket 131 for transmitting power to a sprocket chain or the like 132 which passes around a sprocket 133 on a shaft 134 extending transversely of the upright members 32 and journaled in bearings 135 secured to the uprights. One end of shaft 134 may advantageously be provided with a sheave 136 around which passes a pair of endless belts or the like 137 for driving a sheave 138 on the corresponding end of shaft 31.

Rigid with shaft 31 but adjacent the opposite end thereof is a bevel gear 139 which is in mesh with and drives a bevel gear 140 on the upper end of an upright shaft 141 suitably journaled adjacent the upper and lower ends thereof in bearings carried by brackets 142, the bracket for the lower end of the shaft being mounted on a member 143 which extends transversely of and connects the upright members 32. Adjacent its lower end, the shaft 141 is formed with a sprocket 144 for driving a sprocket chain or the like 145 which passes around a sprocket 146 rigid with the lower end of an upright shaft 147 journaled in the supporting plate 81 of the upper conveyer and extending upwardly through the axis of that turntable. The upper end of shaft 147 is formed with a bevel gear 149 which is in constant mesh with a bevel gear 150 mounted on a transversely extending shaft 151 carried at its opposite ends in bearings 152 secured to the upstanding members 102. Motion is transmitted from this shaft to shaft 88, with which roller 97 at the inner end of the distributing conveyer is rigid, by a sprocket chain or the like 153 which passes around sprockets 154 and 155 on shafts 151 and 88 respectively.

Thus movement is imparted to the endless belt 30 of the elevating conveyer and from there transmitted to the distributing conveyer, it being seen that motion is imparted to the endless belt of the distributing conveyer in all positions it may assume with respect to the harvester when swung on the vertical axis of the upper turntable. It will also be seen that motion is always imparted to the elevating conveyer from the engine since that conveyer and the engine are both mounted on the lower turntable.

Motion is imparted to the endless belt 13 of the main conveyer 2 by driving a shaft to which one of the rollers 15 at the inner end of the conveyer is attached by a sprocket chain or other suitable endless device 156 from a sprocket on the roller 33 at the lower end of the elevating conveyer. And motion is transmitted to the flight conveyer so that the lower reach thereof will travel in the same direction as the upper reach of the elevating conveyer by a sprocket chain or the like 157 which is driven by the shaft on which the pulley 15 driven by the elevating conveyer is mounted. Thus, since the main conveyer and the flight conveyer are driven by the elevating conveyer, it will be seen that they continue in operation for so long as the elevating conveyer continues to operate.

The winch 72 for raising and lowering the outer end of the main conveyer so as to keep it in a position adjacent the tops of the plants in the field being harvested while the mobile unit is moving may advantageously be operated from the speed reducing unit 128 by a sprocket chain 190 which is driven by a sprocket wheel 191 on the output shaft 130 and passes around a sprocket 192 mounted on a shaft 193 of a reversible clutch unit which is preferably arranged within a suitable casing 194 adjacent the winch The sprocket 192 may be clutched and declutched from the winch 72 by operation of a rod 195 which is connected to an upstanding member 196 of the clutch mechanism and extends forwardly therefrom to the cab 1a of the mobile harvesting unit where it may be operated by the driver of the harvester by means of a pivoted lever or handle 197. When the sprocket 192 is declutched from the winch, it becomes merely an idler pulley and it will, therefore, be appreciated that the outer end of the main conveyer may be quickly and easily adjusted by the driver of the harvesting machine to suit the changing topography of the land as the machine travels along during the harvesting operation.

As seen particularly in Figure 16, the chassis of the harvesting vehicle is provided with an upstanding shaft 158 affording a center around which the lower turntable 5 rotates. The weight of the turntable and the mechanism supported thereon is carried by a plurality of rollers 159 which are mounted on substantially horizontally disposed shafts 160 rigidly connected by nuts or the like 161 to upstanding flanges 162 of brackets 163 arranged about the periphery of the turntable and rigidly secured to the platform or base 6 of the truck. The shafts 161 are disposed so that the rollers 159 may engage either the top flange or the bottom flange of a channel 164 which is secured to the under side of the turntable plate and borders the periphery thereof.

Concentric with the aperture formed in the center of the turntable and secured to the under side thereof is a ring gear 165. Meshing with this gear is a smaller gear 166 which is mounted on the upper end of an upright shaft 167 rotatably mounted in the truck chassis. Adjacent its lower end, the shaft 167 is provided with a worm gear 168 which cooperates with a worm 169 carried on the inner end of a substantially horizontal shaft 170 located beneath the chassis. The outer end of shaft 170 is provided with a crank 171 whereby it may be easily rotated and, through the gearing described, rotate the lower turntable and the mechanism carried thereon so that the main conveyer may be caused to extend in the direction desired above the rows of crops in the field being harvested. Moreover, the gearing for rotating the lower turntable enables the main conveyer to swing rearwardly into alignment with the longitudinal axis of the mobile unit so that, when it is desired to transfer the machine from one field to another, it may be moved over public highways without first being partially dismantled.

Rigid with the base plate 81 of the upper conveyer 7 and encircling the upright shaft 147 is a sleeve or collar 172 which itself is encircled by a sleeve 173 rigid with the turntable and depending therefrom to provide a pivotal bearing therefor. The upper turntable is rotatably supported on rollers 174 which engage either the under side of the upper flange or the upper side of a lower flange of a peripheral channel 175 and are mounted on shafts 176 carried by brackets 177 in the same way in which the shafts 160 are carried by the brackets 163 of the lower turntable.

While the upper turntable may be mechanically turned, if desired, it has been found preferable to have it rotated by a worker engaging the outer end of the frame of the distributing conveyer. In this way the worker at the discharge end of the conveyer watching the loading of the pineapples into a truck may move the outer end of the conveyer in an arcuate path to a desired position over the floor of the truck as the loading proceeds so that the pineapples will be distributed substantially uniformly transversely of the truck body.

The truck employed in connection with the harvester is preferably provided with a movable floor in the form of an endless conveyer 178 which may advantageously consist of a plurality of transversely extending boards or slats which are flexibly connected by an endless belt or the like. The front wall 179 of the truck body is preferably attached to and movable with the conveyer floor so that by properly moving the conveyer it may be positioned as shown in Figure 17 closely adjacent the tail gate 180 of the truck body to form a relatively small space for initially receiving the pineapples.

To fill this initial space the distributing conveyer is preferably swung from adjacent one side of the truck to the other. One of the sides or corners of the space may be first effectively filled through a canvas or other flexible chute 198 pivotally connected to the discharge end of the distributing conveyer. The chute is generally U-shape in cross section and at both ends it is provided with metal bands 199 and 200 respectively. The band 199 at the inner end of the chute affords means whereby it may be pivotally connected to the upper portion of the distributing conveyer frame, as indicated at 201.

After the chute has been used to fill up one side or corner of the initial fruit receiving space of the truck to the desired elevation, it is taken out of use by swinging it upwardly on the pivot 201. The chute may be conveniently held in this inoperative position by providing the frame of the conveyer with a transverse member having an upstanding retaining portion 202 adapted to engage the band 200 at the outer end of the chute. If desired, the portion 202 may be nothing more than a short section of pipe. The remaining unfilled space of the truck is then filled up by directing the flow of fruit near the peak of the loaded portion so that the pineapples will be deposited in the truck with only a short free fall. By using the chute 198 temporarily and by thereafter positioning the distributing conveyer so that the fruit will discharge near the peak of the loaded fruit, it will be appreciated that the fruit is deposited in the truck without bruising.

After the initial load receiving space is filled, the front wall of the truck is moved forwardly in the direction indicated by the arrow in Figure 17 to provide a somewhat larger pineapple receiving space. Upon enlargement of the space, the pineapples, of course, settle and of themselves form a depressed upper surface onto which additional pineapples may be deposited, the distance between the discharge end of the conveyer and the depressed upper surface of the pineapples being so small that there is no danger of bruising the fruit.

The front wall of the truck body is successively moved to increase the lading receiving volume of the body until it occupies its normal position, as seen in Figure 18. When in this position, the body will have been loaded to a substantially uniform depth with pineapples with the exception of the space immediately below the discharge end of the distributing conveyer, as seen in Figure 18. Pineapples are permitted to discharge from the distributing conveyer until this space adjacent the tail gate of the truck body has been filled and, since the discharge end of the conveyer can be easily moved from adjacent one side of the truck body to the other and is provided with the flexible chute 190, the pineapples will be loaded uniformly transversely of the body.

During the loading operation, the harvesting unit and the truck into which the pineapples are loaded are preferably coupled together since they must travel more or less in alignment with each other in the same road bordering the field being harvested, the roads bordering the pineapple fields being customarily only wide enough to accommodate a single vehicle. By coupling the harvester and the truck together, a uniform distance is maintained between these two vehicles as they move along the road they occupy during the harvesting and loading operations. The coupling means may be of any suitable construction and may advantageously consist of a rigid bar 181 movably connected to the harvester at one end by a substantially U-shaped bracket 182 and adapted to be removably connected to a truck provided with a suitable connection 183.

Because the roadways bordering the pineapple fields are usually no wider than the width of a conventional vehicle, the harvester is provided at both ends with coupling devices so that it may be connected to the rear of a truck, as shown in Figure 1, or connected to the front end of a truck. When the harvester is connected to the front end of a truck to be loaded, the distributing conveyer is swung around 180° from the position shown in Figure 1 and its vertical elevation is such that it will extend over the cab of the newly coupled truck just as it extends over the cab 1a of the harvester when the conveyer is in the position shown in Figure 1. It will, of course, be appreciated that the coupling devices are generally alternately used so that, while a truck is being filled either at the back or front of the harvesting machine, another truck is moved into loading position at the opposite end of the machine and is coupled to it while still in motion. After the first truck is loaded, it is necessary, therefore, to stop the harvesting machine for only a very short time while the distributing conveyer is rotated approximately 180° from above the loaded truck at one end of the machine to the second truck already coupled to the other end of the machine.

A platform 184 or other suitable support on which an operator may stand to watch and control the loading operation of the machine may conveniently be supported by braces 185 connected to the upright members 32 carried by the lower turntable and by braces 186 connected to two of the legs 82 which are also secured to that turntable. Being connected to the lower turntable, the platform will revolve with it so that the operator will always be able to determine the most advantageous position the main conveyer 2 should occupy with respect to the harvester over the field being harvested and thereby be able to direct another operator to rotate crank 171 one way or the other.

Moreover, the platform is at such elevation that the operator may watch the loading of the pineapples into the truck and, when he sees that the truck is completely loaded, he may stop movement of all of the conveyers of the harvester to prevent continued discharge of the pineapples from the distributing conveyer. To permit the harvester to be thus controlled, a clutch 187 is mounted on shaft 134 whereby the sprocket 133 may be selectively connected to the shaft for the transmission of motion therefrom to the conveyers or disconnected from the shaft so that it will rotate freely thereon. A lever 188 which is pivotally connected at its lower end to the member 143 extends upwardly above the platform so as to be accessible to an operator standing thereon to permit him to operate the clutch 187 and thus control movement of the endless belts of the conveyers.

In coupling the forward end of the harvester to the rear of a truck into which pineapples are to be loaded, it will be found desirable to provide the front end of the harvester with a forward extension 189 to which the coupling bar is connected. This extension makes it possible to employ coupling bars of substantially the same length at both the front and the rear of the harvester so that the discharge end of the distributing conveyer will be positioned over the desired portion of the floor of the truck whether the truck be loaded at the rear or at the front of the harvester. Moreover, when the harvester and truck are coupled, the motor or engine of either one or the other may be operated to move the two vehicles as a unit along the road they occupy.

Various changes and modifications may be made in the particular embodiment of the invention here illustrated and described without departing from the spirit of the invention as defined in the appended claims.

What we claim is:

1. A machine for harvesting pineapples and loading them into the body of a vehicle, involving a main conveyer adapted to extend over the field being harvested on which pineapples are to be placed, said conveyer being mounted adjacent one end thereof to swing about a substantially vertical axis so that it may be positioned with respect to the machine to extend in the desired direction above the field, elevating means for receiving the pineapples from the conveyer and raising them to a level above the top of the vehicle, a distributing conveyer whose inner end is positioned above said conveyer and arranged to receive pineapples discharged from said elevating means, said distributing conveyer being movable about a vertical axis to conduct the pineapples to a point of discharge in proximity to the vehicle body and said elevating means and main conveyer being mounted to swing as a unit about the first mentioned vertical axis.

2. A pineapple harvesting machine involving a boom conveyer adapted to extend over the field being harvested and having an endless belt on which picked pineapples are adapted to be placed, an upwardly extending elevating conveyer pivoted to the inner end of the boom conveyer for receiving the pineapples therefrom and raising them to a higher level, the upper end of said elevating conveyer being pivoted to swing about a substantially horizontal axis, a turntable on which both of said conveyers are mounted whereby the boom conveyer may be positioned to extend in a desired direction above the field, said boom conveyer being caused to extend different distances over the field being harvested upon pivotal movement of said elevating conveyer, and a distributing conveyer for receiving pineapples from said elevating conveyer, said distributing conveyer being pivoted on a substantially vertical axis and being adapted to swing thereon independently of said other conveyers.

3. A pineapple harvesting machine for loading pineapples in the body of a vehicle occupying a road bordering the field being harvested, involving a main conveyer which extends out over the field onto which picked pineapples are to be placed for conveyance toward the road, said conveyer being mounted adjacent one end thereof to swing about substantially a vertical axis, elevating means, mounted to swing substantially about the same vertical axis, for receiving the pineapples from said conveyer and raising them to a level above the top of said body of the vehicle, and conveying means movable about an axis corresponding substantially to the aforementioned vertical axis for receiving pineapples discharged from said elevating conveyer and conducting them to a point of discharge over the body of the vehicle, the receiving end of said conveying means being disposed above the inner end of said main conveyer.

4. A pineapple harvesting machine for loading pineapples into the body of a vehicle occupying a road bordering the field being harvested, involving a main conveyer adapted to extend over the field onto which pineapples are to be placed for conveyance toward the road, an elevating conveyer pivotally connected to the inner end of the main conveyer for receiving pineapples therefrom and raising them to a position above the level of said body of the vehicle, the upper end of said elevating conveyer being pivotally mounted on the machine and the pivotal connection between the main and elevating conveyers being movable toward and away from the machine to cause longitudinal movement of said main conveyer, and a distributing conveyer for receiving pineapples from the elevating conveyer and conducting them to a point of discharge in proximity to said body, said distributing conveyer being mounted to swing on a substantially vertical axis independently of said main conveyer.

5. A pineapple harvesting machine for loading pineapples into the body of a vehicle occupying a road bordering the field being harvested, involving a main conveyer extending over the field on which picked pineapples are adapted to be initially placed, an elevating conveyer for receiving pineapples from the main conveyer and raising them to a level above said body of the vehicle, the inner end of said main conveyer being pivotally connected to said elevating conveyer and both of said conveyers being movably mounted to swing in unison on a substantially vertical axis so that the main conveyer may be positioned to extend in the desired direction over the field, the pivotal connection between the main and elevating conveyers being movable with respect to the machine to permit the main conveyer to extend varying distances therefrom, and a distributing conveyer for receiving pineapples from the elevating conveyer and conducting them to a point of discharge, said distributing conveyer being also adapted to swing on a substantially vertical axis to position its discharge end above and contiguous to said body.

6. A mobile pineapple harvesting machine having a turntable mounted in the base thereof, a main conveyer mounted on said turntable adapted to extend over the field being harvested and to convey picked pineapples placed thereon toward an edge of the field, means mounted on said turntable and movable with said main conveyer for receiving pineapples from said conveyer and raising them to a higher elevation, and a distributing conveyer for receiving pineapples from said means and conducting them to a point of discharge, the receiving end of the distributing conveyer being above the discharge end of the main conveyer and said distributing conveyer being mounted to swing above the main conveyer on a substantially vertical axis.

7. A mobile pineapple harvesting machine having a driver's cab, involving a conveyer adapted to extend out over the field being harvested onto which picked pineapples are to be placed for conveyance toward the machine, means pivotally connected to the discharge end of said conveyer for raising the pineapples received therefrom to a level above the driver's cab, said means being pivotally connected to the machine whereby pivotal movement thereof will cause said conveyer to extend varying distances from said machine, and a distributing conveyer for receiving pineapples from said raising means, said distributing conveyer being revoluble about a substantially vertical axis to swing over said driver's cab to position the discharge end thereof at a desired location.

8. A mobile pineapple harvesting machine having a driver's cab and adapted to occupy a road bordering the field being harvested, comprising conveying apparatus for advancing picked pineapples from the field toward the machine and elevating them to a level above the driver's cab, said apparatus including a main conveyer adapted to extend over the field being harvested on which picked pineapples are adapted to be placed, a pivotally mounted elevating conveyer pivotally connected to the inner end of said main conveyer for receiving pineapples therefrom and elevating them to a level above the driver's cab, a boom for supporting said conveyers, flexible means carried by the boom and connected to the main conveyer adjacent opposite ends thereof for supporting said conveyer, the flexible means adjacent the inner end of the main conveyer being operable to raise or lower the adjacent end thereof and thereby cause the main conveyer to move longitudinally, and a distributing conveyer for receiving pineapples from said elevating conveyer to conduct them to a point of discharge, said distributing conveyer being mounted to swing over said cab on a substantially vertical axis to position the discharge end thereof above the load receiving space of a vehicle occupying the same road as the machine.

9. A mobile pineapple harvesting machine involving a turntable mounted in the base thereof, an upwardly inclined elevating conveyer having its upper end pivotally supported by the turntable, a boom conveyer movably connected to the lower end of said elevating conveyer adapted to extend out over the field being harvested onto which pineapples are to be placed for delivery to the elevating conveyer, a supporting boom pivotally mounted on the turntable and having supporting means connected to the boom conveyer adjacent opposite ends thereof, said boom conveyer being caused to extend different distances from the machine upon movement of the lower end of the elevating conveyer and a distributing conveyer for receiving pineapples from said elevating conveyer and conducting them to a point of discharge.

10. A mobile pineapple harvesting machine involving a turntable having upstanding means rigid therewith mounted in the base of the machine, an elevating conveyer pivotally connected to said upstanding means on a substantially horizontal axis, a boom conveyer connected to said elevating conveyer adapted to extend over the field being harvested on which picked pineapples are placed for delivery to the elevating conveyer, a supporting boom carried by said turntable having flexible means connected to said boom conveyer adjacent its inner and outer ends, devices carried by said upstanding means for guiding said flexible means, said boom conveyer and said elevating conveyer being movable as a unit about a substantially vertical axis when the turntable is actuated, and a distributing conveyer for receiving pineapples from the elevating conveyer and conducting them to a point of discharge.

11. A mobile pineapple harvesting machine involving an upwardly inclined elevating conveyer, a turntable on which said elevating conveyer is mounted, a boom conveyer connected to the lower end of said elevating conveyer and adapted to extend over the field being harvested on which picked pineapples are to be placed for delivery to the elevating conveyer, a supporting boom for said boom conveyer having bifurcated portions adjacent its inner ends straddling the elevating conveyer, said bifurcated portions being pivotally mounted on a substantially horizontal axis on said turntable, and a distributing conveyer for receiving pineapples from said elevating conveyer and conducting them to a point of discharge.

12. A pineapple harvesting machine, including a boom conveyer having an endless belt on which picked pineapples are to be placed, said conveyer being mounted adjacent one end thereof to swing about a substantially vertical axis so that it may extend over the field being harvested, an elevating conveyer for receiving the pineapples from said boom conveyer and raising them to a higher level, said boom conveyer and said elevating conveyer being mounted to swing as a unit about said vertical axis, a distributing conveyer for receiving pineapples from the elevating conveyer and conducting them to a point of discharge, said boom conveyer and distributing conveyer being respectively mounted to swing on substantially the same vertical axis adjacent their inner ends and the receiving end of said distributing conveyer being disposed above the discharge end of the boom conveyer.

13. A mobile pineapple harvesting machine involving a turntable provided with upright means, an elevating conveyer pivoted at its upper end to said upright means, a boom conveyer pivotally connected to said elevating conveyer, a supporting boom for said boom conveyer, cables respectively extending from said supporting boom to support opposite ends of said boom conveyer, a plurality of winches, one of which is mounted on said upright means, around which said cables are respectively wound, and a distributing conveyer for receiving pineapples from said elevating conveyer and conducting them to a point of discharge.

14. A mobile pineapple harvesting machine involving upper and lower turntables respectively rotatable about vertical axes, conveying apparatus carried by said lower turntable including a boom conveyer adapted to extend over the field being harvested for advancing pineapples toward an edge of the field and an elevating conveyer for raising the pineapples to a higher elevation, and a distributing conveyer mounted on the upper turntable for receiving pineapples from said conveying apparatus and conducting them to a point of discharge.

15. A mobile pineapple harvesting machine involving upper and lower turntables respectively rotatable about vertical axes, conveying apparatus carried by said lower turntable including a main conveyer on which picked pineapples are adapted to be placed in the field being harvested and an elevating conveyer for receiving pineapples from the main conveyer for raising them, a boom pivotally mounted on said lower turntable and having flexible means for supporting the main and elevating conveyers, a distributing conveyer carried on said upper turntable and pivotally connected thereto on a substantially horizontal axis, upright means rigid with said upper turntable extending above said distributing conveyer, and flexible means cooperable with said upright means and connected to said distributing conveyer at a point remote from the pivotal axis thereof for vertically adjusting the outer end of the distributing conveyer.

16. A pineapple harvesting machine involving upper and lower turntables respectively rotatable about vertical axes, said upper turntable being supported on said lower turntable conveying apparatus carried by said lower turntable including a main conveyer on which picked pineapples are adapted to be placed in the field being harvested and an elevating conveyer for raising them to a higher elevation, a boom carried by said lower turntable and having flexible means for supporting said conveying apparatus, upwardly extending members mounted on said lower turntable having means for receiving said flexible means upwardly extending members rigid with said upper turntable, a distributing conveyer pivotally connected to said members on a substantially horizontal axis for receiving pineapples from said conveying apparatus and conducting them to a point of discharge, and flexible means cooperable with said members above the pivotal point of the distributing conveyer and connected thereto for vertically adjusting the outer end of the distributing conveyer.

17. A pineapple harvesting machine involving a lower turntable rotatable about a substantially vertical axis, conveying apparatus carried by and movable with said turntable for receiving pineapples from the field and raising them to a higher level, said apparatus including a boom conveyer adapted to extend out over the field to be harvested and an elevating conveyer for raising the pineapples to a higher level, an upper turntable supported on the lower turntable and movable independently thereof, and a distributing conveyer mounted on the upper turntable for receiving pineapples from said conveying apparatus and conducting them to a point of discharge.

18. A pineapple harvesting machine involving upper and lower turntables respectively rotatable about an upright axis, conveying apparatus connected to the lower turntable on a substantially horizontal axis, means rigid with said lower turntable extending upwardly therefrom, flexible means cooperable with said upright means and connected to said conveying apparatus for vertically adjusting said apparatus, a distributing conveyer movably mounted on the upper turntable on a substantially horizontal axis for receiving pineapples from said conveying apparatus and conducting them to a point of discharge, and means carried by the upper turntable and extending upwardly therefrom above the distributing conveyer for vertically adjusting the height of the outer end thereof.

19. A machine for harvesting pineapples and loading them into the body of the vehicle occupying a road bordering the field being harvested, involving an endless conveyer which extends out over the field onto which picked pineapples are placed for conveyance toward the road, mechanism including elevating means for receiving pineapples from said conveyer and conveying them to a point of discharge immediately above the body of the vehicle, said endless conveyer and said elevating means being mounted on the machine to swing as a unit substantially about a vertical axis, said mechanism including a downwardly discharging distributing conveyer mounted to swing substantially also about the aforementioned axis so that the discharge end thereof may be positioned above the body of the vehicle, and a flexible chute connected to the discharge end of said distributing conveyer adapted to extend downwardly into the body of the vehicle into which pineapples initially discharged into the vehicle from the conveyer are caused to pass to minimize bruising of the fruit.

MARVIN BAINBRIDGE.
WILLIAM P. TUTTLE.
HENRY J. BALDWIN
EUGENE S. SHEFFIELD, Jr.

REFERENCES CITED

The following references are of record in the file of this patent:

UNITED STATES PATENTS

| Number | Name | Date |
|---|---|---|
| 897,893 | Hamilton | Sept. 8, 1908 |
| 975,312 | Anderson | Nov. 8, 1910 |
| 985,436 | Mount | Feb. 28, 1911 |
| 1,353,201 | Williams | Sept. 21, 1920 |
| 1,504,846 | Tarkington | Aug. 12, 1924 |
| 1,504,960 | Llewellyn | Aug. 12, 1924 |
| 1,663,825 | Benjamin | Mar. 27, 1928 |
| 1,707,725 | Jantz | Apr. 2, 1929 |
| 1,728,680 | Hartley et al. | Sept. 17, 1929 |
| 1,847,433 | Krause | Mar. 1, 1932 |
| 2,005,442 | Spiegl | June 18, 1935 |
| 2,099,512 | Cartlidge | Nov. 16, 1937 |
| 2,153,037 | Chaffins | Apr. 4, 1939 |
| 2,241,359 | Cartlidge | May 6, 1941 |
| 2,321,387 | Jackson | June 8, 1943 |

FOREIGN PATENTS

| Number | Country | Date |
|---|---|---|
| 550,616 | Germany | May 12, 1932 |